United States Patent [19]  [11] 3,865,818
Krapcho et al.  [45] Feb. 11, 1975

[54] SUBSTITUTED BENZOXAZINES

[75] Inventors: John Krapcho, Somerset; Chester F. Turk, Elizabeth, both of N.J.

[73] Assignee: E. R. Squibb & Sons, Inc., Princeton, N.J.

[22] Filed: Oct. 24, 1973

[21] Appl. No.: 409,101

[52] U.S. Cl........ 260/240 F, 260/240.1, 260/240.7, 260/244 R, 260/247, 260/268 R, 260/293.51, 260/326.8, 260/583 G, 260/999
[51] Int. Cl............................................ C07d 87/50
[58] Field of Search .......... 260/240 F, 240.1, 240.7, 260/244 R

[56] References Cited
UNITED STATES PATENTS

| | | | |
|---|---|---|---|
| 3,635,956 | 1/1972 | Krapcho | 260/240 F |
| 3,746,706 | 7/1973 | Krapcho | 260/240 F |
| 3,812,114 | 5/1974 | Krapcho | 260/244 R |

Primary Examiner—Arthur P. Demers
Attorney, Agent, or Firm—Lawrence S. Levinson; Merle J. Smith; Stephen B. Davis

[57] ABSTRACT

Compounds of the following formula and their N-oxides and their acid addition and quaternary salts

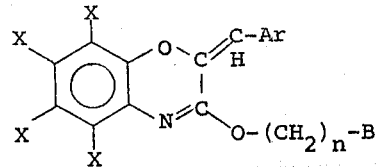

wherein X is hydrogen, halogen, amino, hydroxy, nitro, trifluoromethyl, lower alkyl, or lower alkoxy; n is an integer from 2 to 5; Ar is an aryl radical selected from the group consisting of phenyl, X-substituted phenyl, pyridyl, thienyl, and furyl; and B is (lower alkyl) amino, di(lower alkyl)-amino, pyrrolidino, piperidino, morpholino, 4-lower akyl piperazino or 4-(X-substituted phenyl) piperazino are disclosed. In addition, methods of preparing said compounds, pharmaceutical compositions containing said compounds and methods of using said compounds as central nervous system depressants and as inhibitors of choline acetyltransferase are disclosed.

13 Claims, No Drawings

SUBSTITUTED BENZOXAZINES

This invention relates to new compounds of the formula:

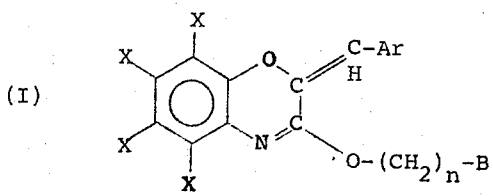

(I)

and their N-oxides, and their acid addition and quaternary salts, which are central nervous system depressants and inhibitors of choline acetyltransferase.

X represents hydrogen, halogen, trifluoromethyl, amino, nitro, hydroxy, lower alkyl or lower alkoxy; $n$ is an integer from 2 to 5; Ar represents an aryl radical selected from phenyl, X-substituted phenyl, pyridyl, thienyl, and furyl; and B represents (lower alkyl)amino, di(lower alkyl)amino, pyrrolidino, piperidino, morpholino, 4-lower alkyl piperazino, and 4-(X-substituted phenyl)-piperazino.

The terms "lower alkyl" and "lower alkoxy" as employed herein include both straight and branched chain radicals of less than eight carbon atoms, for example, methyl, ethyl, propyl, isopropyl, butyl, isobutyl, t-butyl, methoxy, ethoxy, propoxy, isopropoxy, and the like.

DETAILED DESCRIPTION OF THE INVENTION

The new compounds of formula I are prepared by treating the appropriate substituted 1,4-benzoxin-3-one represented by the following formula

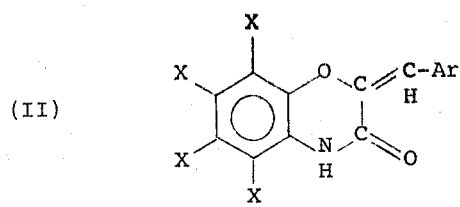

(II)

with a condensing agent such as sodium hydride, sodium hydroxide, sodium amide, potassium tertiary butoxide, butyllithium, or the like in an inert organic medium such as toluene or dimethylsulfoxide or the like to convert formula II to the following intermediate

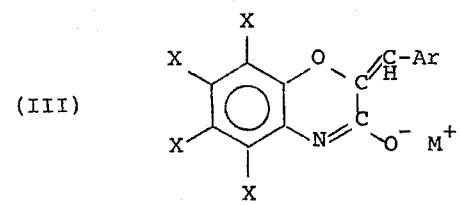

(III)

wherein M is sodium, potassium, or lithium. The intermediate III is then reacted with reagents of the general formula $$halo(CH_2)_nB$$

to form the compounds of formula I.

Reaction conditions vary with the choice of condensing agent used to convert II to III and with the halo $(CH_2)_nB$ employed.

Alternatively, the intermediate of formula III can be reacted with Cl $(CH_2)_nBr$ with the resulting intermediate treated with HB to form the compounds of formula I.

X, n, Ar and B have the same meaning as above. The starting compounds of formula II may be prepared according to methods known in the art, for example, see U.S. Pat. No. 3,746,706.

A preferred method for obtaining a final product of formula I wherein X is amino is to reduce the corresponding nitro-substituted compound by chemical (e.g., $SnCl_2$) or catalytic hydrogenation.

Compounds wherein X is hydroxy may be prepared by treating the corresponding alkoxy compounds with hot pyridine hydrochloride in known manner.

The compounds of formula I form pharmaceutically acceptable salts which are also part of this invention. The salts include acid-addition salts and the quaternary ammonium salts. The bases of formula I form acid addition salts by reaction with a variety of acids. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids such as maleic, fumaric, tartaric, citric, acetic, benzoic, 2-acetoxybenzoic, salicylic, succinic, nicotinic, methanesulfonic or cyclohexanesulfamic. The quaternary ammonium salts include those formed with alkyl halide (e.g., methyl chloride, isobutyl bromide, dodecyl chloride and cetyl iodide), benzyl halides (e.g., benzyl chloride) and dilower alkyl sulfates (e.g., dimethyl sulfate) by a conventional quaternization reaction.

Also within the purview of this invention are the N-oxides of the compounds of formula I. The N-oxides may be formed by reacting the compounds of formula I with the usual oxidizing agents such as hydrogen peroxide or organic peracids under appropriate conditions.

Preferred among the variables are the following: X is hydrogen or halogen, n is 2 or 3, Ar is phenyl, and B is di (lower alkyl) or 4-lower alkyl piperazino, especially where lower alkyl is methyl.

The new compounds of the present invention are useful as central nervous system depressants in mice, cats, rats, dogs and other mammalian species when administered in amounts ranging from about 0.5 mg. to about 10.0 mg. per kg. of body weight per day. A preferred dosage regimen for optimum results would be from about 1 mg. to about 5 mg. per kg. of body weight per day, and such dosage units are employed that a total of from about 35 mg. to about 3 g. of active ingredient in single or divided doses are administered in a 24 hour period.

For these purposes a compound or mixture of compounds of formula I, non-toxic pharmaceutically acceptable acid addition or quaternary ammonium salts thereof, or N-oxides thereof, may be administered orally or parenterally in a conventional dosage form such as tablet, capsule, injectable or the like. These may be conventionally formulated in an oral or parenteral dosage form by compounding with a conventional vehicle, excipient, binder, preservative, stabilizer, flavor or the like as called for by accepted pharmaceutical practice.

The new compounds of the present invention also function as inhibitors of choline acetyltransferase.

The following examples are illustrative of the invention and represent preferred embodiments. Other modifications may be readily produced by suitable variations of the reactions. All temperatures are on the centigrade scale.

EXAMPLE 1

2-Benzylidene-3-[3-(dimethylamino)propoxy]-2H-1,4-benzoxazine, hydrochloride

A stirred suspension of 10.3 g. (0.044 mole) of 2-benzylidene-2H-1,4-benzoxazin-3(4H)-one in 85 ml. of dimethylsulfoxide was treated with 2.2 g. (0.046 mole) of 50% sodium hydride (oil dispersion). The temperature gradually rose to 35°, accompanied by foaming. When the temperature began to drop, the mixture was warmed to 70°, cooled to 25°, treated with 31 ml. (0.068 mole) of a 2.2 N toluene solution of 3-dimethylaminopropyl chloride, and stirred at 70°–75° for 5 hours.

After being kept at room temperature overnight, the reaction mixture was poured into 700 ml. of cold water and extracted with 200 ml. of ether (4 times). The ether layers were combined, washed with 100 ml. of water (2 times) and extracted with a cold solution of 7 ml. of concentrated HCl in 100 ml. of water, followed by 50 ml. of water. The combined aqueous extracts were washed with 100 ml. of ether, cooled, treated with 14 g. of $K_2CO_3$, and extracted with 100 ml. of ether (4 times). The combined extracts were dried ($MgSO_4$), and the solvent evaporated to give 11.7 g. of solid base; M.P. 57°–59° (from isopropyl ether).

A cooled solution of the base (11.3 g.) in 90 ml. of isopropyl alcohol was treated with 6.2 ml. of 6 N alcoholic HCl. On rubbing, the crystalline HCl salt rapidly separated. Ether was added to complete the precipitation and after cooling overnight the product was filtered, washed with cold isopropyl alcohol and ether, and dried in vacuo, weight 10.9 g. (70%); M.P. 191°–193°. Following crystallization from 100 ml. of isopropyl alcohol, the colorless 2-benzylidene-3-[3-(dimethylamino)propoxy]-2H-1,4-benzoxazine, hydrochloride weighed 8.6 g. (55%); M.P. 196°–198°.

EXAMPLE 2

2-Benzylidene-3-[2-(dimethylamino)ethoxy]-2H-1,4-benzoxazine, hydrochloride

A stirred suspension of 22 g. (0.093 mole) of 2-benzylidene-2H-1,4-benzoxazin-3(4H)-one in 1 l. of toluene was treated with 4 g. (0.1 mole) of $NaNH_2$ and heated to reflux. After cooling to 40°, a solution of 2-dimethylaminoethyl bromide in 200 ml. of toluene was added [freshly prepared from 35 g. (0.15 mole) of the HBr salt] and the mixture was refluxed for 5 hours. The product was isolated according to the procedure of Example 1 to give 13.2 g. of solid base; M.P. 89°–91° (from acetonitrile). The crude HCl salt, prepared in ether, weighed 13.8 g. (43%), M.P. 253°–255°. Following crystallization from 200 ml. of methyl alcohol, the colorless 2-benzylidene-3-[2-dimethylamino)ethoxy]-2H-1,4-benzoxazine, hydrochloride weighed 10.5 g. (33%); M.P. 253°–255°.

EXAMPLE 3

2-Benzylidene-3-[2-(morpholino)ethoxy]-2H-1,4-benzoxazine, hydrochloride

Interaction of 12.9 g. (0.054 mole) of 2-benzylidene-2H-1,4-benzoxazin-3-(4H)-one, 2.4 g. (0.06 mole) of $NaNH_2$, 11 g. (0.073 mole) of N-(2-chloroethyl)morpholine and 1 g. of NaI in 600 ml. of toluene according to the procedure of Example 2 yielded 6.2 g. of the HCl salt. After crystallization from 80 ml. of methyl alcohol, the colorless 2-benzylidene-3-[2-(morpholino)ethoxy]-2H-1,4-benzoxazine, hydrochloride weighed 4.5 g.; M.P. 260°–262° (dec.).

EXAMPLE 4

2-Benzylidene-3-[3-(diethylamino)propoxy]-2H-1,4-benzoxazine, hydrochloride

A suspension of 6.0 g. (0.025 mole) of 2-benzylidene-2H-1,4-benzoxazin-3(4H)-one (finely divided) in 150 ml. of toluene was stirred vigorously and treated with 4.0 g. (0.1 mole) of powdered NaOH. After 5 minutes, 13.8 g. (0.05 mole) of 3-diethylaminopropyl bromide hydrobromide was added and the mixture was stirred and heated on a steam bath for one hour. The product was isolated according to the procedure described in Example 1 to give 6.2 g. of base. After crystallization from cold isopropyl ether, the colorless base weighed 4.5 g.; M.P. 60°–62°.

The hydrochloride salt was purified by crystallization from methyl ethyl ketone to give 2-benzylidene-3-[3-(diethylamino)propoxy]-2H-1,4-benzoxazine, hydrochloride; M.P. 156°–158°.

EXAMPLE 5

2-Benzylidene-3-[3-(4-methyl-1-piperazinyl)propoxy]-2H-1,4-benzoxazine, dihydrochloride 6 g. (0.025 mole) of 2-benzylidene-2H-1,4-benzoxazin-3(4H)-one was pulverized, suspended in 125 ml. of toluene, stirred vigorously, and treated with 4 g. (0.1 mole) of powdered NaOH. After 5 minutes, 13 g. (0.034 mole) of 1-(3-bromopropyl)-4-methylpiperazine. 2HBr was added and the mixture was heated on a steam bath with vigorous stirring for 1 hour. The base was isolated as described in Example 1.

The resulting oily base (7.3 g.) was dissolved in 50 ml. of ethyl alcohol, cooled, and treated with 6.5 ml. of 6.2 N alcoholic HCl. The crystalline 2HCl salt rapidly separated. Ether was added to complete the precipitation. After cooling overnight, the material was filtered, washed with ether, and dried in vacuo yielding 7.3 g. (65%); M.P. 254°–256° (dec.). Crystallization of this material from a mixture of 450 ml. of ethyl alcohol and 150 ml. of methyl alcohol yielded 5.1 g. (45%) of nearly colorless 2-benzylidene-3-[3-(4-methyl-1-piperazinyl)-propoxy]-2H-1,4-benzoxazine, dihydrochloride; M. P. 262°–264° (dec.).

EXAMPLE 6

2-Benzylidene-3-[3-(4-phenyl-1-piperazinyl)propoxy]-2H-1,4-benzoxazine, hydrochloride Following the procedure of Example 5 but substituting an equivalent quantity of 1-(3-bromopropyl)-4-phenylpiperazine hydrobromide for the 1-(3-bromopropyl)-4-methylpiperazine dihydrobromide, 2-benzylidene-3-[3-(4-phenyl-1-piperazinyl)propoxy]-2H-1,4-benzoxazine, hydrochloride was obtained.

EXAMPLE 7

2-Benzylidene-6-chloro-3-[3-dimethylamino)propoxy]-2H-1,4-benzoxazine; hydrochloride a. 2-Benzylidene-6-chloro-2H-1,4-benzoxazin-3-(4H)-one A stirred mixture of 11.2 g. (0.061 mole) of 6-chloro-2H-1,4-benzoxazin-3(4H)-one, 10 ml. of benzaldehyde, and 23 ml. of acetic anhydride was treated with 12 ml. of triethylamine and refluxed for 6 hours. After standing overnight at room temperature, the crystalline material which separated was filtered, washed with acetonitrile, and air dried, yielding 7.4 g. (45%); M.P. 264°–266°. Following crystallization from a mixture of 20 ml. of hot dimethylformamide and 60 ml. of acetonitrile, the yellow solid 2-benzylidene-6-chloro-2H-1,4-benzoxazin-3(4H)-one weighed 6.8 g. (41%); M.P. 266°–268°.

b. 2-Benzylidene-6-chloro-3-[3-(dimethylamino)-propoxy]-2H-1,4-benzoxazine, hydrochloride A stirred suspension of 6.7 g. (0.025 mole) of the product from part (a) in 50 ml. of dimethylsulfoxide was treated with 1.25 g. of 50% NaH (oil dispersion). The temperature gradually rose to 35° accompanied by foaming. When the temperature began to drop, the mixture was warmed to 25°, treated with 18 ml. (0.039 mole) of a 2.2 N toluene solution of 3-dimethylaminopropyl chloride, stirred at 70°–75° for 5 hours, and kept overnight at room temperature during which time a crystalline solid separated. The mixture was diluted with 500 ml. of cold water and extracted with 125 ml. of CHCl₃ (4 times). The combined extracts were washed with 100 ml. of water (2 times), dried (MgSO₄), and the solvent evaporated to give 8.0 g. of solid base; M.P. 128°–130°. Crystallization from 50 ml. of acetonitrile gave 6.9 g. of the nearly colorless solid base; M.P. 132°–134°.

A cooled solution of 6.8 g. of the base in 25 ml. of CHCl₃ was treated with 3.1 ml. of 6.2 N alcoholic HCl. There was an immediate precipitation of the solid HCl salt. Ether was added to complete the precipitation. After cooling overnight, the material was filtered, washed with ether, and dried in vacuo, to give 7.7 g. (80%); M.P. 248°–250°. Following crystallization from 70 ml. of acetonitrile, the colorless 2-benzylidene-6-chloro-3-[3-(dimethylamino)propoxy]-2H-1,4-benzoxazine, hydrochloride weighed 6.6 g. (69%); M.P. 250°–252°.

EXAMPLE 8

2-Benzylidene-6-chloro-3-[3-(4-methyl-1-piperazinyl)propoxy]-2H-1,4-benzoxazine, dihydrochloride Interaction of 6.7 g. (0.025 mole) of 6-chloro-2-benzylidene-2H-1,4-benzoxazin-3(4H)-one from part (a) of Example 7 with 4.0 g. (0.1 mole) of powdered NaOH and 13 g. (0.034 mole) of 1-(3-bromopropyl)-4-methylpiperazine 2 H Br in 125 ml. of toluene as described in Example 5 gave 10.2 g. of syrupy residue. After standing overnight, the material was shaken with 100 ml. of water and 100 ml. of ether, separated, the aqueous layers extracted with 100 ml. of ether (4 times), the combined layers dried, and evaporated. The crude base (9.5 g.) was dissolved in 300 ml. of ether, filtered, cooled, and treated with 200 ml. of ether containing 8.5 ml. of 6.0 N alcoholic HCl. The 2 HCl salt was precipitated as a gelatinous solid. After standing in the cold overnight, the material was filtered under nitrogen, washed with ether, and dried in vacuo (the solvent was held tenaciously), to give 6.8 g. (57%); M.P. 293°–295° (dec.). Since the material was difficultly soluble in the common solvents, it was pulverized, stirred with 100 ml. of boiling methyl alcohol, cooled overnight, filtered, washed with cold methyl alcohol, washed with ether, and dried in vacuo. The final yield of colorless solid 2-benzylidene-6-chloro-3-[3-(4-methyl-1-piperazinyl)propoxy]-2H-1,4-benzoxazine, dihydrochloride was 5.5 g. (46%); M.P. 304°–306° (dec.).

EXAMPLE 9

2-(2-Chlorobenzylidene)-3-[3-(dimethylamino)propoxy]-2H-1,4-benzoxazine, hydrochloride a. 2-(2-Chlorobenzylidene)-2H-1,4-benzoxazin-3-(4H)-one A stirred mixture of 31 g. (0.21 mole) of 2H-1,4-benzoxazin-3(4H)-one, 47 g. (0.33 mole) of o-chlorobenzaldehyde, and 78 ml. of acetic anhydride was treated with 39 ml. of triethylamine and refluxed for 6 hours. On cooling to room temperature and rubbing, a crystalline solid separated. After standing overnight, the latter was filtered, washed with acetonitrile, and air dried to give 13.5 g. (24%); M.P. 242°–244°. Following crystallization from 25 ml. of hot dimethylformamide and 50 ml. of acetonitrile, the light yellow solid 2-(2-chlorobenzylidene)-2H-1,4-benzoxazin-3(4H)-one weighed 11.7 g. (21%); M.P. 248°–250°.

b. 2-(2-Chlorobenzylidene)-3-[3-dimethylamino)-propoxy]-2H-1,4-benzoxazine, hydrochloride 6.7 g. (0.025 mole) of the material from part (a) was reacted with 1.25 g. (0.025 mole) of 50% NaH and 18 ml. (0.039 mole) of a 2.2 N toluene solution of 3-dimethylaminopropyl chloride in 50 ml. of dimethylsulfoxide as described in Example 1. The crude oily base (6.3 g.) was dissolved in 50 ml. of isopropyl alcohol, cooled, and treated with 2.8 ml. of 6.0 N alcoholic HCl. On rubbing, the crystalline HCl salt separated. Ether was added to complete the precipitation. After cooling overnight, the material was filtered, washed with ether, and dried in vacuo to give 5.9 g. (61%); M.P. 219°–221°. Following crystallization from 200 ml. of isopropyl alcohol, the light yellow solid 2-(2-chlorobenzylidene)-3-[3-(dimethylamino)propoxy]-2H-1,4-benzoxazine, hydrochloride weighed 4.8 g. (50%); M.P. 222°–224°.

EXAMPLE 10

2-Benzylidene-3-[3-(piperdino)propoxy[-2H-1,4-benzoxazine, hydrochloride

Following the procedure of Example 1 but substituting an equivalent quantity of 3-(piperidino)propyl chloride for the 3-dimethylaminopropyl chloride, 2-benzylidene-3-[3-(piperidino)propoxy]-2H-1,4-benzoxazine, hydrochloride was obtained.

EXAMPLE 11

2-Benzylidene-3-[3-(pyrrolidino)propoxy]-2H-1,4-benzoxazine, hydrochloride

Following the procedure of Example 1 but substituting an equivalent quantity of 3(pyrrolidino)propyl chloride for the 3-dimethylaminopropyl chloride, 2-benzylidene-3-[3-(pyrrolidino)propoxy]-2H-1,4-benzoxazine, hydrochloride was obtained.

EXAMPLE 12

2-Benzylidene-3-[3-(ethylamino)propoxy]-2H-1,4-benzoxazine, hydrochloride

Following the procedure of Example 4 but substituting an equivalent quantity of 3-ethylaminopropyl bromide hydrobromide for the 3-diethylaminopropyl bromide hydrobromide, 2-benzylidene-3-[3-(ethylamino)-propoxy]-2H-1,4-benzoxazine, hydrochloride was obtained.

EXAMPLES 13–20

Utilizing the procedure of Example 7 but substituting for the benzaldehyde in Part (a) the indicated aldehyde shown in column I, the designated 6-chloro-3-[3-(dimethylamino)propoxy]-2-(aryl methylene)-2H-1,4-benzoxazine, hydrochloride is obtained wherein the 2-aryl substituent is indicated in column II.

| | I | II |
|---|---|---|
| Ex. | Aldehyde | 2-aryl substituent |
| 13 | 2-thiophenecarboxaldehyde | 2-thienyl |
| 14 | 2-furancarboxaldehyde | 2-furyl |
| 15 | 2-, 3-, or 4-pyridinecarboxaldehyde | 2-, 3-, or 4-pyridyl |
| 16 | 4-ethylbenzaldehyde | 4-ethylphenyl |
| 17 | 2,4-dichlorobenzaldehyde | 2,4-dichlorophenyl |
| 18 | 3-trifluorobenzaldehyde | 3-trifluorophenyl |
| 19 | 3,4,5-trimethoxybenzaldehyde | 3,4,5-trimethoxyphenyl |
| 20 | 2-nitrobenzaldehyde | 2-nitrophenyl |

EXAMPLES 21–27

Utilizing the procedure in Example 1 but substituting for the 2-benzylidene-2H-1,4-benzoxazin-3(4H)-one the following materials
6-ethoxy-, 7-trifluoromethyl-, 6-methyl-, 6-nitro-, 7-bromo-, 5,6-dimethoxy-, and 5,6,7,8-tetrafluoro-2-benzylidene-2H-1,4-benzoxazin-3(4H)-one,
there is obtained

| Examples | Product |
|---|---|
| 21 | 6-ethoxy-3-[3-(dimethylamino)propoxy]-2-benzylidene-2H-1,4-benzoxazine, hydrochloride |
| 22 | 7-trifluoromethyl-3-[3-(dimethylamino)propoxy]-2-benzylidene-2H-1,4-benzoxazine, hydrochloride |
| 23 | 6-methyl-3-[3-(dimethylamino)propoxy]-2-benzylidene-2H-1,4-benzoxazine, hydrochloride |
| 24 | 6-nitro-3-[3-(dimethylamino)propoxy]-2-benzylidene-2H-1,4-benzoxazine, hydrochloride |
| 25 | 7-bromo-3-[3-(dimethylamino)propoxy]-2-benzylidene-2H-1,4-benzoxazine, hydrochloride |
| 26 | 5,6-dimethoxy-3-[3-(dimethylamino)propoxy]-2-benzylidene-2H-1,4-benzoxazine, hydrochloride |
| 27 | 5,6,7,8-tetrafluoro-3-[3-(dimethylamino)propoxy]-2-benzylidene-2H-1,4-benzoxazine, hydrochloride |

EXAMPLE 28

2-Benzylidene-3-[3-(dimethylamino)propoxy]-2H-1,4-benzoxazine, methochloride

A solution of 10 g. of the base from Example 1 in 100 ml. of acetonitrile is cooled and treated with 20 g. of methyl chloride. The solution is allowed to stand for one day and the solvent evaporated to give 2-benzylidene-3-[3-(dimethylamino)propoxy]-2H-1,4-benzoxazine, methochloride.

EXAMPLE 29

2-Benzylidene-3-[3-(dimethylamino)propoxy]-2H-1,4-benzoxazine, N-oxide, hydrochloride A solution of the base from Example 1 in acetic acid is treated with an equivalent quantity of 30% hydrogen peroxide and the solution then heated at 80°–90° for 1 hour and cooled. The solvent is removed on a rotary evaporator at reduced pressure. The residue is dissolved in chloroform and treated with hydrogen chloride. Evaporation of the solid yields the above named product.

What is claimed is:

1. A compound of the formula

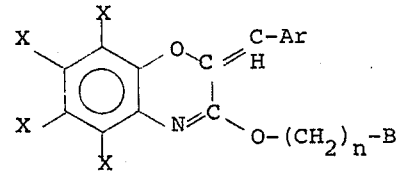

where X is selected from the group consisting of hydrogen, halogen, amino, nitro, hydroxy, trifluoromethyl, lower alkyl, and lower alkoxy; $n$ is an integer from 2 to 5; Ar is selected from the group consisting of phenyl, X-substituted phenyl wherein X is as defined previously, pryridyl, thienyl, and furyl; and B is selected from the group consisting (lower alkyl)amino, di(lower alkyl)-amino, pyrrolidino, piperidino, morpholino, 4-lower alkyl piperazino, and 4-(X-substituted phenyl)-piperazino wherein X is as defined previously and N-oxides and pharmaceutically acceptable acid addition and quaternary salts thereof.

2. The compounds of claim 1 wherein B is di(lower alkyl)amino.

3. The compound of claim 2 having the name 2-benzylidene-3-[3-(dimethylamino)propoxy]-2H-1,4-benzoxazine, hydrochloride.

4. The compound of claim 2 having the name 2-benzylidene-3-[2-(dimethylamino)ethoxy]-2H-1,4-benzoxazine, hydrochloride.

5. The compound of claim 2 having the name 2-benzylidene-3-[3-(diethylamino)propoxy]-2H-1,4-benzoxazine, hydrochloride.

6. The compound of claim 2 having the name 2-benzylidene-6-chloro-3-[3-(dimethylamino)propoxy[-2H-1,4-benzoxazine, hydrochloride.

7. The compound of claim 2 having the name 2-(2-chlorobenzylidene)-3-[3-(dimethylamino)propoxy]-2H-1,4-benzoxazine, hydrochloride.

8. The compound of claim 1 wherein B is selected from the group consisting of 4-lower alkyl piperazino and 4-(X-substituted phenyl)piperazino.

9. The compound of claim 8 having the name 2-benzylidene-3-[3-(4-methyl-1-piperazinyl)propoxy]-2H-1,4-benzoxazine, dihydrochloride.

10. The compound of claim 8 having the name 2-benzylidene-6-chloro-3-[3-(4-methyl-1-piperazinyl)propoxy]-2H-1,4-benzoxazine, dihydrochloride.

11. The compound of claim 1 having the name 2-benzylidene-3-[2-(morpholino)ethoxy]-2H-1,4-benzoxazine, hydrochloride.

12. A method for preparing a compound of claim 1 comprising treating a compound of the formula

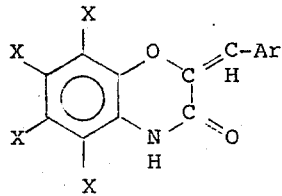

with a condensing agent selected from the group consisting of sodium hydride, sodium hydroxide, sodium amide, potassium tertiary butoxide and butyllithium in an inert organic medium, followed by treating the product of that reaction with compounds of the formula

halo(CH$_2$)$_n$B wherein X, B, $n$ and Ar have the same meaning as in claim 1.

13. A method for preparing a compound of claim 1 comprising treating a compound of the formula

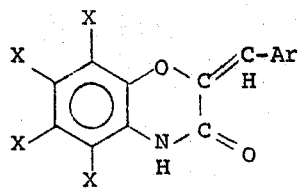

with a condensing agent selected from the group consisting of sodium hydride, sodium hydroxide, sodium amide, potassium tertiary butoxide, and butyllithium in an inert organic medium, treating the product of that reaction with compounds of the formula Cl(CH$_2$)$_n$Br followed by treating the product of that reaction with HB wherein X, $n$, B and Ar have the same meaning as in claim 1.

* * * * *

UNITED STATES PATENT OFFICE
CERTIFICATE OF CORRECTION

PATENT NO. : 3,865,818
DATED : Feb. 11, 1975
INVENTOR(S) : John Krapcho et al.

It is certified that error appears in the above-identified patent and that said Letters Patent are hereby corrected as shown below:

In the abstract, 7th line after the formula, "akyl" should read --alkyl--.

Col. 6, line 56, "propoxy[" should read --propoxy]--.

Col. 8, line 32, "phenyl," should be deleted.

Col. 8, line 53, "propoxy[" should read --propoxy]--.

Signed and sealed this 10th day of June 1975.

(SEAL)
Attest:

RUTH C. MASON
Attesting Officer

C. MARSHALL DANN
Commissioner of Patents
and Trademarks